INVENTOR
FREDERICK W. SCOVILLE

BY Raphael Semmes
ATTORNEY

INVENTOR
FREDERICK W. SCOVILLE

BY Raphael Semmes
ATTORNEY

INVENTOR
FREDERICK W. SCOVILLE
BY Raphael Semmes
ATTORNEY

United States Patent Office 3,395,385

Patented July 30, 1968

3,395,385

TRANSIENT SIGNAL RECORDER INCLUDING A ROTATING RECORDING HEAD ASSEMBLY

Frederick W. Scoville, Rockville, Md. (% NUS Corp., 1730 M St. NW., Washington, D.C. 20036)

Filed Oct. 13, 1966, Ser. No. 586,541
19 Claims. (Cl. 340—15)

ABSTRACT OF THE DISCLOSURE

A continuously rotating recording head assembly, including three equally spaced recording heads, repeatedly scans a stationary section of a magnetic recording tape which is wrapped about a portion of its rotating circumference. When a received signal exceeds a predetermined threshold, as determined by a threshold detector, a transmission gate is opened to permit a recording to be made on the section of magnetic recording tape during a recording interval. After the recording interval, the recording tape is advanced to bring a new section of recording tape into engagement with the recording head assembly. In order to avoid the inertia of the supply reel, a length of tape from the supply reel is stored in a tape supply storage section comprising a plurality of idler pulleys, some of which are mounted on a pivoted, spring-biased supply arm. An additional tape storage section is provided between the recording head assembly and a take-up reel.

This invention relates to signal recorders and, more particularly, to magnetic tape recorders for recording transient data signals.

It is sometimes desirable to obtain a permanent record of signals corresponding to recurrent physical or electrical phenomena. For example, in investigations of sonic booms it is convenient to obtain a recording of the acoustic pressure signatures of the sonic booms for later study and wave analysis. Although a conventional magnetic tape recorder employing a continuously moving tape may be used to record such signals, in cases where the signals are spaced in time to any significant extent the waster of recording capacity on the tape makes this impractical. It is, of course, possible to employ a recorder in which the recording medium is stationary and is caused to advance upon the reception of the signal. However, with equipment of this type, the time required to bring the recording medium to its proper recording speed will cause distortion of the initial portion of the transient signal. It has also been suggested in the prior art to record transients upon a continuously moving endless surface, such as a recording drum or endless belt; but systems of this character require that the recorded signal be erased; and no permanent record is retained on the recording medium or a second time delayed recording is required, resulting in a signal to noise degradation due to the second recording process.

It is the principal object of the invention to provide an improved signal recording apparatus.

More specifically, it is an object of the invention to provide a signal recording system which avoids the aforementioned drawbacks of prior art systems and which provides the instantaneous recording of a transient signal without distortion due to the starting of a mechanical mechanism and without wastage of recording tape when a signal is not present.

According to the present invention, the signals are recorded on a stationary section of magnetic recording tape by means of a continuously rotating recording head assembly. Although similar systems have been disclosed in the prior art, these have been limited to the repetitive scanning of previously recorded tracks by means of rotating reproducing head assemblies (see Gordon et al. Patent No. 3,075,049, for example). Since it is necessary, after the recordation of a signal on the section, to present a new section of stationary recording tape to the revolving recording head assembly, it is an object of the invention to provide means for advancing the tape subsequent to the recording of a signal thereon.

The continuously rotating recording head assembly will, after an extended period of time, cause excessive wear on the recording tape. Accordingly, it is a further object of the invention to provide means to advance the recording tape periodically to present a fresh section of recording tape to the rotating recording head assembly. A related object is the provision of means to block the means to advance the recording tape periodically, if the time for such advance should coincide with the reception and recordation of a signal.

It is an additional object of the invention to provide threshold detecting means to permit only signals having an amplitude exceeding a predetermined minimum to be recorded on the recording tape.

Another object of the invention is the provision of a plural channel system of the aforementioned character, whereby a plurality of signals may be recorded on separate channels on the recording tape. Yet another object is the provision of a calibration signal generator and means to cause the recordation of a calibration signal subsequent to the recordation of a received signal.

Still another object relates to the provision of means for recording a reference channel to provide a time and frequency reference on the recording tape.

Since it is desirable to advance the recording tape rapidly subsequent to the recordation of the received signal and calibration signal, it is an object of the invention to provide means for storing magnetic tape to avoid the inertia of a supply reel. An additional object is the provision of means to maintain the recording tape stationary during recording intervals and to advance the tape in intervals subsequent thereto.

A further object of the invention pertains to the arrangement of the recording tape about the revolving recording head assembly in such a way that at least one recording head of the recording head assembly will record a complete trace of the received signal.

Briefly, the invention contemplates the employment of a continuously rotating recording head assembly having three multi-channel recording heads equally spaced about its rotating periphery repeatedly to scan a stationary section of a magnetic recording tape which is wrapped about a portion of the rotating circumference of the recording head assembly. A plurality of microphones are provided for receiving acoustic sonic boom signals at spaced points, and each of these microphones is connected in a separate channel to a transmission gate coupled to separate channels of the recording heads. Threshold detectors are provided for each channel so that only received signals which exceed a predetermined amplitude are directed through the transmission gate to the recording heads. A first timing circuit is provided to provide a control pulse to maintain the transmission gates open for a signal recording interval sufficiently long enough to permit the recordation of the received signals. A calibration generator is controlled by a second timing circuit to provide a calibration signal to the recording channels through the transmission gates during a calibration interval following the signal recording interval. An additional timing circuit causes the tape to be advanced during a tape advance interval subsequently to the calibration interval. In order to prevent excessive wear of the section of tape in engagement with the constantly rotating recording head assembly, a digital clock is provided to cause periodic advance of the recording tape. Since it is not desirable to advance the tape while a signal is being recorded, means are provided for preventing the digital clock from causing an advance of the tape during signal recording, calibration, and tape advance intervals.

The magnetic recording tape is provided on a supply reel, and follows a path from the supply reel past the recording head assembly to a take-up reel. Since it is desirable to avoid the inertia of the supply reel, a length of tape is stored in a tape section comprising a plurality of idler pulleys, some of which are mounted on a pivoted supply arm. The supply arm has an extension upon which a friction shoe is provided to engage a brake drum coupled to the supply reel. A pinch anchor normally engages the tape and prevents its movement relative to the revolving recording head assembly. However, during the tape advance interval, the pinch anchor is disengaged and a drive capstan and drive pulley are engaged with the tape to cause forward movement thereof. This causes pivoting of the supply arm and disengagement of the friction shoe from the brake drum. A tension sensing pulley is employed for controlling the energization, and direction of rotation, of a motor coupled to the take-up reel.

The foregoing and other objects, advantages, and features of the invention and the manner in which the same are accomplished will become more readily apparent upon consideration of the following detailed description of the invention when taken in conjunction with the accompanying drawings, which illustrate a preferred and exemplary embodiment, and wherein.

Figure 1:
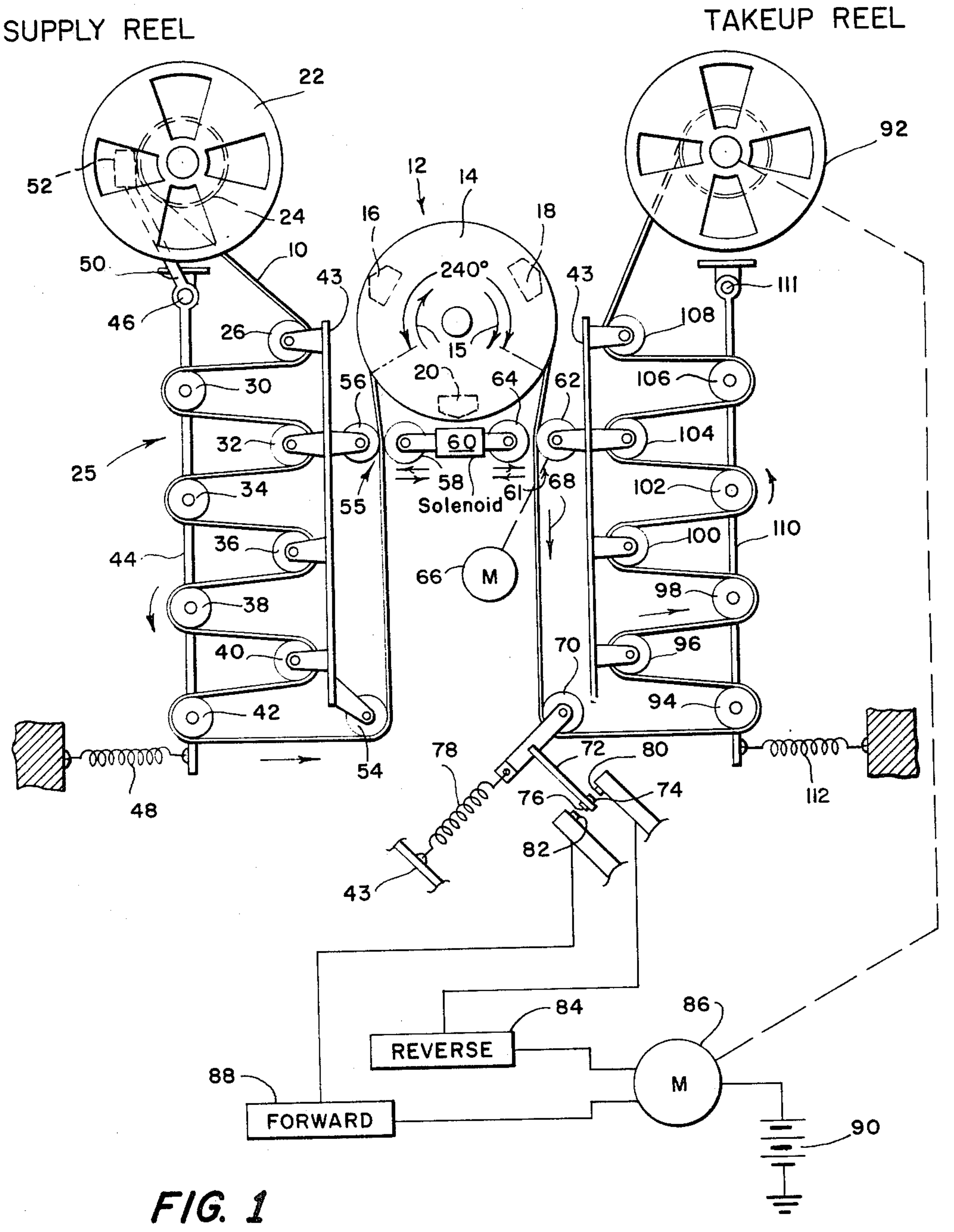
FIGURE 1 is a schematic diagram showing the structure of a magnetic tape recorder of the present invention.

Turning first to FIGURE 1, it will be seen that a magnetic tape recording apparatus of the invention comprises a magnetic recording tape 10, a section 12 of which is maintained stationary and wrapped about a portion of the circumference of a continuously rotating cylindrical recording head assembly 14. It is to be understood that the recording head assembly is constantly rotating in the direction illustrated by arrows 15 and comprises three-multi-channel recording heads 16, 18 and 20 which are spaced at 120 degree intervals about its circumference. Signals are coupled to the heads in parallel through either slip rings or a rotary transformer (not shown).

The head rotation speed is determined by the signal bandwidth requirements. For example, a speed of 7.5 inches per second would be required for a bandwidth of 2500 c.p.s. to be consistent with conventional IRIG (Inter-Range Instrumentation Group) instrumentation recorders. The circumferential spacing between recording heads is determined by both the head rotation speed and the maximum record duration. For example, for a signal duration of 0.4 second plus calibration time of 0.1 second and a recording head speed of 7.5 inches per second, the circumferential distance between recording heads would be 7.5 in./sec. x 0.5 sec. or 3.75 inches. The total circumference of recording head assembly 14 will thus be 3.75 inches x 3 or 11.25 inches. It follows that the diameter of recording head assembly 14 is 3.58 inches.

Recording head assembly 14 is provided with three heads and section 12 is in contact with 240 degrees of the circumference of assembly 14 so that an incoming signal will be recorded in its entirety by at least one head rather than only partly by each head, possibly in the wrong time sequence. If, for example, only two record heads were used and the magnetic tape covered 180 degrees of the circumference of assembly 14, an incoming signal would be recorded in its entirety, but not by one head. One portion of the signal would be recorded by one head and the remainder by the other head. The two portions of the signal would not necessarily appear in proper time sequence when played back and would complicate data analysis. By using three heads spaced 120 degrees apart and a section 12 covering a minimum of 240 degrees of recording head assembly circumference, at least one head will record a complete signal without interruption.

The magnetic recording tape is wound on a supply reel 22 which is coupled to a brake drum 24. A length of tape 10 is pulled from the supply reel and is stored in a storage section 25 which comprises idler pulleys 26, 30, 32, 34, 36, 38, 40 and 42, the tape being advanced in a path about these pulleys in sequence in zig-zag fashion. Pulleys 26, 32, 36 and 40 are fixedly mounted on the frame of the machine as indicated at 43, while pulleys 30, 34, 38 and 42 are mounted on a supply arm 44 which is pivoted to the frame of the machine at 46. The length of recording tape in storage section 25 serves at a tape supply which will be readily available for rapid advance of the recording tape without being encumbered by the inertia of supply reel 22. It is to be understood that a length of tape equal to or greater than the length of tape section 12 is stored in storage section 25.

It is to be noted that the supply arm 44 is spring-biased to the position shown by means of a spring 48. The supply arm is provided with a supply arm extension 50 which supports a friction shoe 52, normally engaged with brake drum 24 to prevent rotation of the supply reel.

After the tape is taken around idler wheel 42 it passes over an idler wheel 54, fixedly mounted on the machine frame 43, to a pinch anchor 55 comprising a stationary idler pulley 56 (mounted on frame 43) and an idler pulley 58 mounted to reciprocate with the armature of a solenoid 60. It will be noted that, as shown in the drawing, pulley 58 is normally biased into engagement with tape 10 to maintain tape section 12 stationary in cooperation with pulleys 56. After the tape leaves the pinch anchor it is wrapped about the rotating circumference of recording head assembly 14 and is maintained in engagement with at least 240 degrees of this circumference. After leaving the recording head assembly, the tape passes tape advancing means 61 comprising a pinch anchor idler 64 and a tape advance capstan 62, the former being mounted on the armature of solenoid 60. As shown in FIGURE 1, the pinch anchor idler 64 is normally disengaged from the recording tape. When, however, as it will be explained more fully hereinafter, solenoid 60 is energized, pinch anchor idler 64 will be shifted to the right, as shown in the figure, so that both advance capstant 62 and pinch anchor idler 64 engage the tape. Since the tape advance capstan 62 is coupled to be driven by a tape drive motor 66, which will be energized at the same time as solenoid 60, the tape will be advanced in the direction shown by arrows 68.

By virtue of the energization of solenoid 60, pinch anchor idler 58 will be shifted to the right, as shown in the drawing, to disengage pinch anchor 55 from the tape. This will permit the tape to be advanced, causing tension in the tape which will exert a force on pulleys 30, 34, 38 and 42 mounted on supply arm 44. This will cause supply arm 44 to pivot to the right, with the result that supply arm extension 50 will move to the left to lift friction shoe 52 out of engagement with brake drum 24. In practice, an electromagnetic clutch in lieu of a friction clutch may be used. This will permit free rotation of the supply reel, allowing the tape in tape supply section 25 to be replenished.

As will be explained more fully hereinafter, only a sufficient length of tape is advanced to replace tape section 12 with a new section of tape to be wrapped about the rotating circumference of recording head assembly 14.

After the tape passes drive pulley 62 and advance capstan 64, it is brought around a tension regulator pulley 70. This pulley is coupled to a switch arm 72 which supports a pair of contacts 74 and 76 on opposite sides thereof. The tension regulator pulley is normally biased by means of an electrically conducting spring 78 to position switch arm 72 midway between a pair of stationary contacts 80 and 82. Contact 80 is connected to a "Reverse" circuit 84 connected to a take-up reel drive motor 86, while contact 82 is connected to a "Forward" circuit 88 also connected to take-up reel drive motor 86, which is arranged to drive a take-up reel 92. Motor 86 is also connected to a supply of voltage, which is shown as a battery 90, but which may also be an alternating current supply depending upon the nature of the motor. It will be observed that when the tension in the tape is slack contact 76 will engage with contact 82 to complete a circuit through spring 78, arm 72, "Forward" circuit 88, motor 86, and voltage supply 90. This will cause take-up reel 92 to be wound in a direction to wind the tape on the reel and increase the tension in the tape. If the tension in the tape becomes too great, switch arm 72 will bring contact 74 into engagement with contact 80 to energize "Reverse" circuit 84 and cause motor 86 to rotate take-up reel 92 in the reverse direction to provide a reduction of the tension. This will serve to compensate for over-winding of reel 92 following disengagement of tape advance means 61. After leaving tension regulator 70, the tape is advanced, in sequence, about idler pulleys 94, 96, 98, 100, 102, 104, 106 and 108, which function to store temporarily the tape length advanced by tape advancing means 61. It is to be noted that idlers 96, 100, 104 and 108 are mounted on the frame 43 of the machine, while idler pulleys 94, 98, 102 and 106 are mounted on an arm 110 which is pivotally mounted on the frame at 111 and which is spring-biased by means of a spring 112. From pulley 108, the tape is wound upon take-up reel 92.

Figure 2:
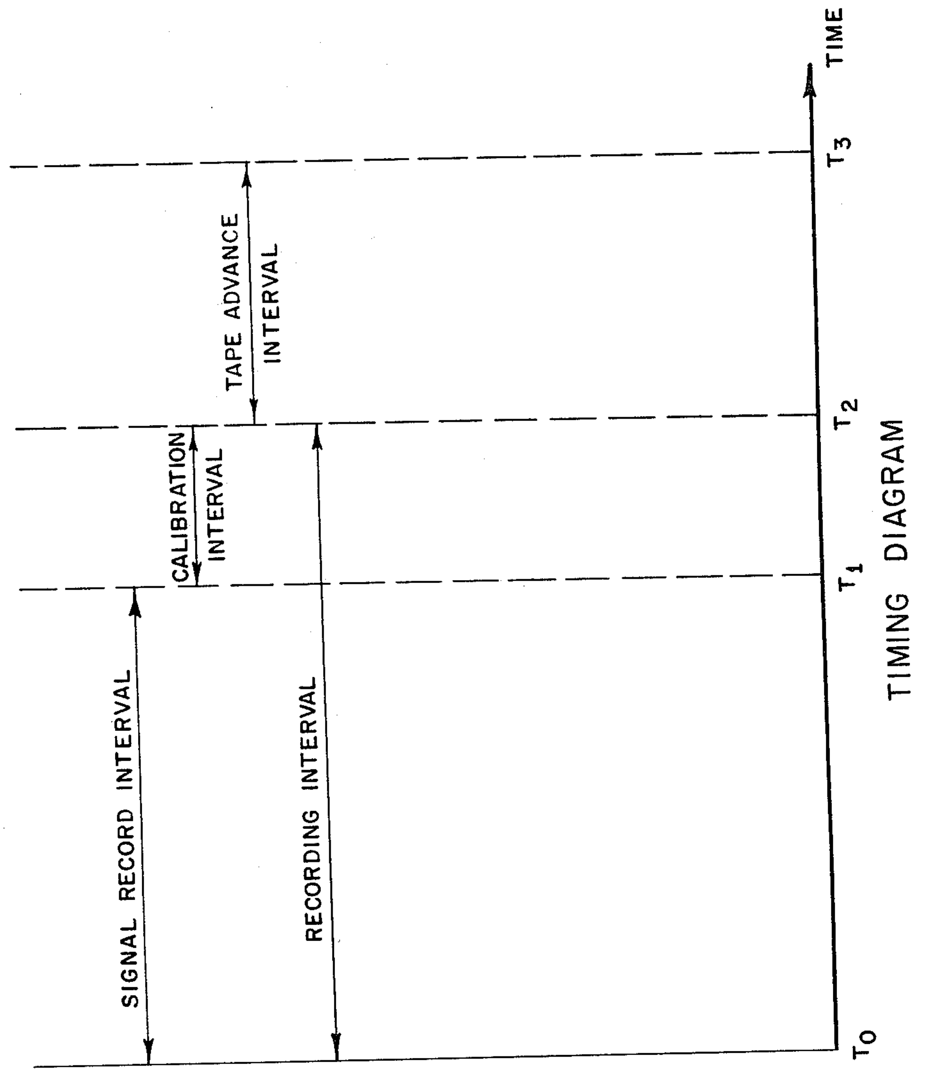
FIGURE 2 is a diagram illustrating a feature of the invention.

When a signal is received it is necessary that the recording head be energized for an interval which is long enough relative to the length of the signal that none of the signal is lost. As shown in the timing diagram of FIGURE 2, a signal may be received at time $T_0$ and will be recorded during a "signal record" interval running to time $T_1$. In the case of an acoustic pressure signature of a sonic boom, the interval may be of the order of 0.4 second. Subsequent to the recording to the received signal, a calibration signal will be recorded during a "calibration" interval of the order of 0.1 second extending from time $T_1$ to time $T_2$. The time extending from $T_0$ to time $T_2$ may be considered as a "recording" interval. Subsequent to the recording interval the tape is advanced during a "tape advance" interval from time $T_2$ to time $T_3$ to present a new tape section 12 to the rotating circumference of recording head assembly 14. The manner in which the recording apparatus of the invention is controlled to effectuate these functions during the times indicated will be explained with reference to the circuit diagram shown in FIGURE 3.

Figure 3:
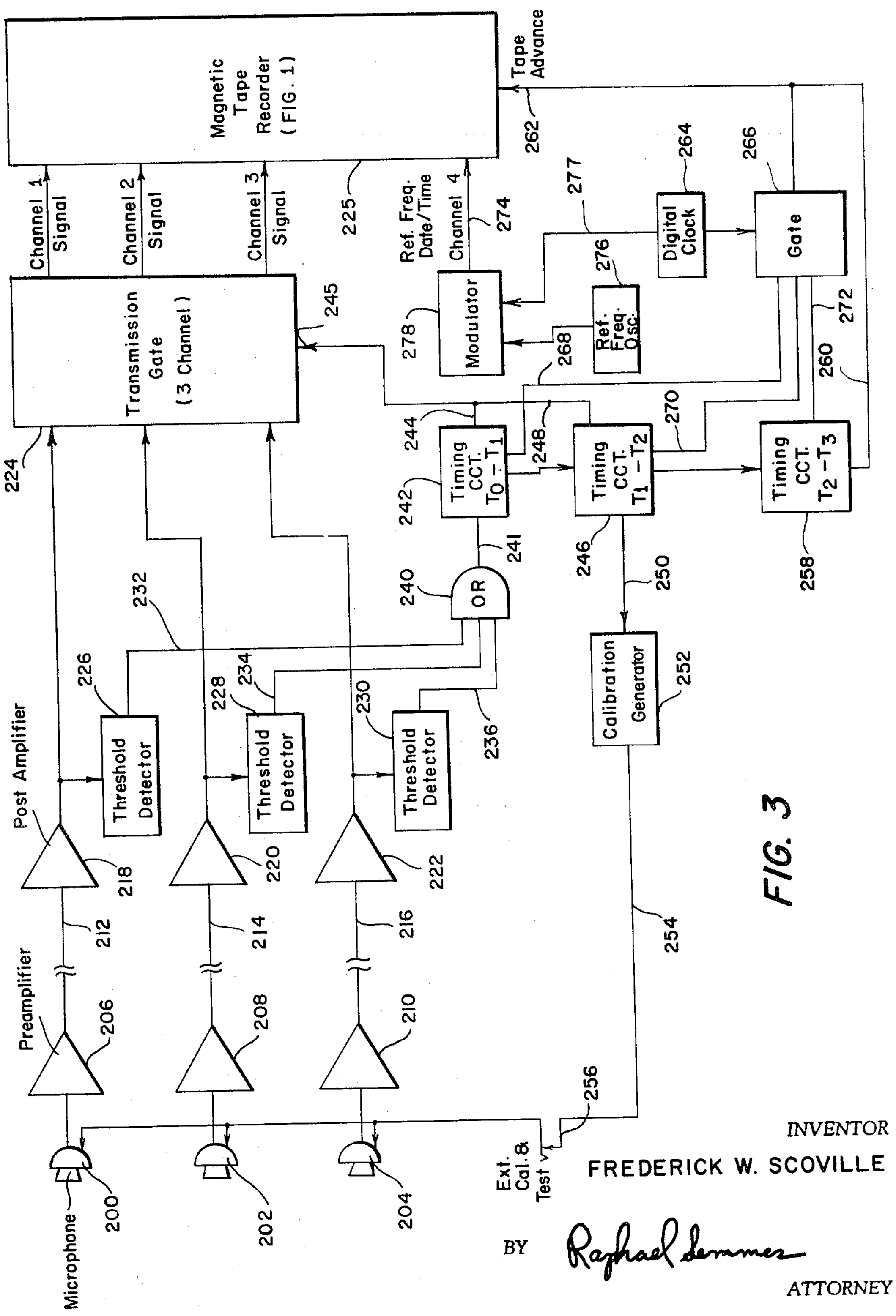
FIGURE 3 is a schematic circuit diagram showing a recording system of the invention.

The system shown in FIGURE 3 is designed to record acoustic pressure signatures of a sonic boom at several spaced points. Accordingly, a plurality of microphones 200, 202 and 204 are provided to receive the pressure wave of a sonic boom at spaced points which, for example, may be 500 feet apart, remote from the magnetic recording apparatus. In order to provide sufficient amplitude to the received signals so that they may be transmitted to the remote recording apparatus preamplifiers 206, 208 and 210 are respectively coupled to microphones 200, 202 and 204. The outputs of preamplifiers 206, 208 and 210 are coupled to cables 212, 214 and 216 which are respectively connected to post amplifiers 218, 220 and 222, which amplify the signals to a level sufficient for recording.

In order to prevent the recordation of undesirable signals of relatively low amplitude, a three channel transmission gate 224 is provided. This transmission gate normally blocks the three channels received from microphones 200, 202 and 204. When, however, as will be presently explained, signals of sufficient magnitude are received by the microphones, the transmission gate channels are opened to provide signals on channels 1, 2 and 3, which are coupled to the multi-channel recording heads 16, 18 and 20 of magnetic tape recorder 225, which corresponds to the tape recorder shown in FIGURE 1. In this way, a plurality of channels will be recorded on section 12 of magnetic recording tape 10.

In order to control transmission gate 224, threshold detectors 226, 228, and 230 are coupled, respectively, to post amplifiers 218, 220 and 222. These threshold detectors are designed to provide output signals on lines 232, 234 and 236, respectively, when signals exceeding a predetermined magnitude are detected thereby. Terminals 232, 234 and 236 are connected as the input leads of an OR circuit 240. Thus, when any one of threshold detectors 226, 228 or 230 provides an output signal indicating a signal exceeding the predetermined magnitude, the OR circuit 240 will be actuated to provide an output signal on lead 241 to trigger a timing circuit 242. This timing circuit will provide an output pulse on an output lead 244 coupled to a control terminal 245 of transmission gate 224, to open the three channels of the transmission gate. This pulse will have a duration corresponding to the "signal record" interval extending from time $T_0$ to time $T_1$.

At the termination of the "signal record" interval at time $T_1$ a second timing circuit 246 will be triggered to provide a second control pulse on an output lead 248 which is coupled to transmission gate control terminal 245 to maintain the three channels thereof open during the "calibration" interval between times $T_1$ and $T_2$. At the same time, a pulse provided on lead 250 is coupled to a calibration signal generator 252 to trigger this generator to provide an output signal on lead 254 which is coupled to microphones 200, 202 and 204 to provide a calibration reference signal of known magnitude to be recorded in the various channels on recording tape section 12 subsequent to the recorded signals received from microphones 200, 202 and 204.

In order to facilitate calibration by an external signal at the will of the operator, an external calibration and test jack 256 is provided to couple an external calibration signal through the various microphones. This external calibration signal could, for example, serve to test the effectiveness of the threshold detectors.

At the termination of the "calibration" interval at time $T_2$, a third timing circuit 258 will be energized to provide a "tape advance" signal on lead 260 which is connected to a "tape advance" control terminal 262 of magnetic tape recorder 225. The "tape advance" signal will serve to cause the energization of solenoid 60 and tape drive motor 66 of tape recorder 225. At the termination of the tape advance interval at time $T_3$, the pulse from timing circuit 258 will terminate, causing deenergization of solenoid 60 and tape drive motor 66. The "tape advance" time interval extending from times $T_2$ to time $T_3$ is selected with reference to the geometry of the circumference of the recording head assembly to permit sufficient advance of the tape to bring an adjacent section of recording tape 10 in contact with the circumference of the continuously rotating recording head assembly 14.

Since long intervals will frequently occur during which no signals will be received exceeding the predetermined minimum amplitude to be detected by the threshold detectors, excessive wear may result on section 12 of the recording tape by virtue of its contact with the rotating circumference of recording head assembly 12 and cause degradation of recording quality. Accordingly, a digital clock 264 periodically provides an additional "tape advance" signal to cause advance of the tape to present a new adjacent section of tape 10 to the recording head assembly 14. It is to be understood that the digital clock 264 will provide a pulse of the same duration as the pulse provided by timing circuit 258 to establish an interval having the same duration as the "tape advance" interval between time $T_2$ and time $T_3$. In a typical practical situation, the digital clock will cause advance of the tape at intervals in the range from one to eight hours.

Since advance of the tape by virtue of the signal received from digital clock 264 during the "recording" interval and "tape advance" interval is not desirable, a gate circuit 266 is provided to prevent signals from digital clock 264 from being applied to "tape advance" terminal 262 of magnetic tape recorder 225. In order to effectuate this control, leads 268, 270 and 272 are taken from timing circuits 242, 246 and 258, respectively, to apply control signals to gate 266 to close the gate during the interval extending from time $T_0$ to time $T_3$.

It has been found that it is desirable to have some time reference on the recording tape, and a fourth channel is provided for this purpose as indicated at 274. A reference frequency oscillaor 276 provides a signal having a frequency which may be of the order of 100 kilo-Hertz. The digital clock 264 provides timing pulses on an output lead 277 to modulate the signal from reference frequency oscillator 276 in a modulator 278. The output from the modulator is applied to channel 4 of magnetic tape recorder 225.

Timing circuits 242, 246 and 258 have been shown coupled in a chain and may take the form of pulse circuits wherein the termination of the pulse provided by timing circuit 242 causes triggering of timing circuit 246 to provide a pulse the end of which causes triggering of timing circuit 258 to provide a further pulse. It is to be understood, however, that the same result could be accomplished by providing a clock circuit which could be triggered by the output on lead 241 from OR circuit 240. This clock circuit would then provide a transmission gate control pulse covering the interval from time $T_0$ to time $T_2$ to the transmission gate 224 to open the channels during the recording interval. The clock circuit would provide a pulse on lead 250 during the calibration interval from time $T_1$ to time $T_2$ to trigger the calibration generator. This clock circuit would also provide a pulse from time $T_2$ to time $T_3$ during the "tape advance" interval to be applied to "tape advance" terminal 262. In addition, the clock circuit would provide a single pulse from time $T_0$ to time $T_3$ to serve as an inhibiting signal for gate 266 to close this gate as previously explained.

As indicated above, in the normal operation of the recording system of the invention, transmission gate 224 will maintain the three channels from microphones 200, 202, and 204 closed. When, however, the acoustic pressure wave of a sonic boom is received at any one of the three microphones, the threshold detector associated with the channel of that microphone will provide a signal to OR circuit 240, which, in turn, will trigger timing circuit 242. This timing circuit will provide a control pulse on lead 244 to define a "signal record" interval which is longer than the transient waveform of an acoustic pressure signature of the sonic boom. Since the three microphones 200, 202 and 204 are spaced apart and will receive the pressure wave of the sonic boom at different times, it is desirable to make the "signal record" interval long enough to record the acoustic pressure signatures of the sonic boom as received at the three locations of the microphones.

The control signal applied to transmission gate 224 will open the three channels of the gate permitting the signals received on microphones 200, 202 and 204 to proceed to the multi-channel recording heads 16, 18 and 20 of magnetic tape recorder 225. By virtue of the continuous rotation of recording head assembly 14, each of the recording heads will record a recording track replica of the received signal in each of three channels on the tape. By virtue of the geometry of tape section 12 with respect to recording head assembly 14, whereby 240 degrees of the rotating circumference of recording head assembly 14 is in contact with section 12, at least one of the recording heads 16, 18 and 20 will record an uninterrupted trace of the received signal in its entirety. At the end of the "signal record" interval, the second timing circuit 246 will be triggered to provide an additional control pulse on lead 248 to maintain transmission gate 224 open until time $T_2$. Meanwhile, calibration generator 252 will be actuated during the "calibration" interval between $T_1$ and $T_2$. The calibration signal will be applied through microphones 200, 202 and 204 and will be recorded on the magnetic tape subsequent to the recording of the received signals. At time $T_2$ timing circuit 246 will trigger timing circuit 258 to provide a "tape advance" signal to terminal 262 of magnetic tape recorder 225. This will cause solenoid 60 and tape drive motor 66 to become energized. As a result, pinch anchor idler pulley 58 will be shifted to the right out of contact with tape 10 and tape advance capstan 64 will be moved into engagement with the tape causing it to advance. The tension in the tape will cause supply arm 44 to pivot and release friction shoe 52 from brake drum 24. As the tape moves forward, tension regulator pulley 70 will detect a lowering of the tension in the tape and cause switch arm 72, which is normally in a neutral position midway between contacts 80 and 82, to bring contact 76 into engagement with contact 82 and energize the "Forward" circuit 88 of take-up reel drive motor 86. This will cause the take-up reel to rotate and wind the tape upon the take-up reel. If, the tension in the tape is over-corrected, as will happen upon deenergization of tape drive motor 66 and disengagement of advance capstan 64 and tape drive motor 66, the arm 72 will bring contact 74 into engagement with contact 80 and energize the "Reverse" circuit 84 of motor 86 to cause reverse rotation of the take-up reel. It is to be understood that the control pulse applied to the "tape advance" terminal 262 of magnetic tape recorder 225 will terminate at $T_3$, causing deenergization of solenoid and tape drive motor 66. This will occur when a section of tape 10 which is adjacent to section 12 has been brought into contact with the periphery of recording head assembly 14.

As previously explained, digital clock circuit 264 will provide a "tape advance" control signal periodically to prevent excessive wear on the tape, and the "tape advance" signal from this clock will be blocked in gate 266 by signals from timing circuits 242, 246 and 258 during the interval from $T_0$ to $T_3$.

While a preferred embodiment of the invention has been shown and described, it will be apparent to those skilled in the art that changes can be made without departing from the principles and spirit of the invention, the scope of which is defined in the appended claims. Accordingly, the foregoing embodiment is to be considered illustrative rather than restrictive of the invention, and those modifications which come within the meaning and range of equivalency of the claims are to be included therein.

The invention claimed is:

1. Signal recording apparatus comprising: an elongated recording medium; means to maintain a section of said medium stationary; a continuously rotating recording head assembly positioned to scan said section repeatedly; signal input means; gate means to couple said signal input means to said recording head assembly, said gate means being normally closed; threshold detector means to detect a signal at said signal input means exceeding a predetermined magnitude; means responsive to said threshold detector means for opening said gate means for a predetermined recording time interval to permit recordation of said signal on said section; recording medium advancing means for advancing said medium to bring an adjacent section thereof into scanning relationship with said assembly; and means for causing actuation of said advancing means during a recording medium advance time interal following said recording time interval.

2. Signal recording apparatus as recited in claim 1, wherein said medium is magnetic recording tape and said assembly comprises magnetic recording means.

3. Signal recording apparatus as recited in claim 2, wherein said magnetic recording means comprises at least three magnetic recording heads equally spaced about the rotating circumference of said assembly, and wherein said section is maintained in scanning engagement with a portion of said circumference which is large enough to permit at least one of said heads to record said signal as a complete trace without interruption.

4. Signal recording apparatus as recited in claim 3, wherein the number of said heads is three, and wherein said section engages at least 240 degress of said circumference.

5. Signal recording apparatus as recited in claim 1, further comprising clock means to cause actuation of said record medium advancing means periodically to prevent excessive wear of said medium.

6. Signal recording apparatus as recited in claim 5, further comprising means for blocking said actuation by said clock means during said time intervals.

7. Signal recording apparatus as recited in claim 1, wherein said recording time interval comprises a signal recording time interval followed by a calibration recording time interval, and said apparatus further comprises a calibartion signal generator coupled to said input means, and means for actuating said calibration generator during said calibration recording interval.

8. Signal recording apparatus as recited in claim 1, wherein said signal input means comprises a plurality of signal receiving channels, said threshold detector means comprises a threshold detector for each receiving channel, said gate means comprises a gate channel for each receiving channel, and said recording head assembly comprises a recording channel for each receiving channel.

9. Signal recording apparatus as recited in claim 8, wherein each of said signal receiving channels is coupled to one of a plurality of microphones, said microphones being spaced apart.

10. Signal recording apparatus as recited in claim 9, wherein said microphones are adapated to receive acoustic pressure signatures produced by a sonic boom, whereby transient signals corresponding to said pressure signatures will be recorded in a plurality of channels on said recording medium.

11. Signal recording apparatus as recited in claim 1, wherein said elongated recording medium is a recording tape; and wherein said apparatus further comprises a supply reel, a pivoted tape supply arm having idler means mounted thereon and being spring-biased to a first position, pinch anchor means, and capstan drive means; said supply arm having a supply arm extension secured thereto and supporting a friction shoe, which in said first position of said supply arm engages a brake drum coupled to said supply reel; said recording medium being wound on said supply reel, and from said supply reel over said idler means, through said pinch anchor means, around said recording head assembly, past said capstan drive means, and to a takeup reel; said pinch anchor means being said means to hold said section stationary and being normally engaged with said tape, and said capstan drive means being normally disengaged from said tape; and said recording medium advancing means comprising means for disengaging said pinch anchor means from said tape and engaging said capstan drive means with said tape, whereby upon engagement of said capstan drive means with said tape a tension will develop therein to cause said idler means to pivot said supply arm to a second position, bringing said friction shoe out of engagement with said brake drum.

12. A tape recorder comprising a supply reel; a tape storage section; a rotating recording head assembly; a take-up reel; a recording tape wound on said supply reel and extending through said storage section, about a portion of the rotating circumference of said recording head assembly and to said take-up reel; anchor means normally engaged with said tape for maintaining the section of said tape extending about said assembly stationary; tape drive means normally disengaged from said tape; and control means for conditioning said assembly for recording on said section of tape during a recording interval while said section is held stationary by said anchor means and for disengaging said anchor means and engaging said drive means for advancing said section of tape from said assembly to said tape-up reel and from said storage section to said assembly during a tape advance interval.

13. A tape recorder as recited in claim 12, wherein said tape storage section comprises a plurality of movable idler rollers, a plurality of fixed idler rollers, said tape extending over said movable and fixed rollers alternately and means biasing said movable rollers for movement in a direction to oppose tension in said tape.

14. A tape recorder as recited in claim 12, further comprising drive means for said take-up reel and means responsive to tension in said tape between said assembly and said take-up reel for controlling energization of said drive means.

15. A tape recorder as recited in claim 12, wherein said tape storage section comprises a movable idler roller, means extending said tape over said roller, and means biasing said idler roller for movement in a direction to oppose tension in said tape.

16. A tape recorder as recited in claim 15, further comprising means responsive to movement of said idler roller in said direction to apply brake means to said supply reel.

17. A tape recorder as recited in claim 12, further comprising a second tape storage section between said assembly and said take-up reel.

18. A tape recorder as recited in claim 17, wherein said second storage section comprises a movable idler roller, means extending said tape over said roller, and means biasing said idler roller for movement in a direction to oppose tension in said tape.

19. A tape recorder as recited in claim 17, wherein said second tape storage section comprises a plurality of movable idler rollers, a plurality of fixed idler rollers, said tape extending over said movable and fixed rollers alternately, and means biasing said movable rollers for movement in a direction to oppose tension in said tape.

References Cited

UNITED STATES PATENTS

| | | | |
|---|---|---|---|
| 2,851,676 | 9/1958 | Woodcock et al. | 226—145 X |
| 2,991,022 | 7/1961 | Wallens | 242—75.51 |
| 3,222,008 | 12/1965 | Purzycki | 242—75.43 |
| 3,290,438 | 12/1966 | Okamura | 179—100.2 |

RICHARD A. FARLEY, *Primary Examiner.*

D. C. KAUFMAN, *Assistant Examiner.*